United States Patent
Cronholm et al.

(10) Patent No.: US 7,278,632 B2
(45) Date of Patent: Oct. 9, 2007

(54) GAS SPRING

(75) Inventors: Marcus Cronholm, Mjölby (SE); Leif Lundahl, Nöbbele (SE); Jakob Axelsson, Linköping (SE)

(73) Assignee: Stromsholmen AB, Tranas (SE)

( * ) Notice: Subject to any disclaimer, the term of this patent is extended or adjusted under 35 U.S.C. 154(b) by 135 days.

(21) Appl. No.: 10/536,985

(22) PCT Filed: Apr. 5, 2004

(86) PCT No.: PCT/SE2004/000528

§ 371 (c)(1),
(2), (4) Date: May 31, 2005

(87) PCT Pub. No.: WO2004/090370

PCT Pub. Date: Oct. 21, 2004

(65) Prior Publication Data

US 2006/0096819 A1    May 11, 2006

(30) Foreign Application Priority Data

Apr. 11, 2003  (SE) .................................. 0301095

(51) Int. Cl.
*F16F 9/18* (2006.01)
(52) U.S. Cl. ..................... 267/124; 267/64.11
(58) Field of Classification Search ............ 267/64.11, 267/64.13, 64.16, 64.17, 124, 64.15; 188/322.15, 188/322.13, 322.22
See application file for complete search history.

(56) References Cited

U.S. PATENT DOCUMENTS

| 3,109,520 A | 11/1963 | Vossieck |
| 4,369,864 A | 1/1983 | de Carbon |
| 4,775,038 A | 10/1988 | Unnikrishnan et al. |
| 5,070,971 A | 12/1991 | Dourson et al. |
| 6,199,671 B1 * | 3/2001 | Thyssen ..................... 188/62 |
| 6,220,406 B1 * | 4/2001 | de Molina et al. .......... 188/275 |
| 6,286,640 B1 | 9/2001 | Bertrand et al. |
| 7,040,468 B2 * | 5/2006 | Shinata ................ 188/322.15 |
| 7,070,029 B2 * | 7/2006 | Deferme ................ 188/322.15 |

FOREIGN PATENT DOCUMENTS

| DE | 3935159 A1 | 4/1991 |
| EP | 0798485 A3 | 10/1997 |
| FR | 359201 | 3/1906 |
| FR | 686705 | 1/1953 |
| WO | WO 02079664 A1 | 10/2002 |

* cited by examiner

*Primary Examiner*—Melanie Torres
(74) *Attorney, Agent, or Firm*—Fay Sharpe LLP; Brian E. Turung (57) ABSTRACT

A gas spring for a pressing tool. A cylindrical chamber is divided by a piston into a first space and a second space. The piston is attached to a piston rod, which is axially moveable in the cylindrical chamber. The gas spring is designed with an opposing force to counteract a movement that is produced by forces acting axially on the piston rod in that the first space and the second space are pressurized with a gas. Passages connect the first space and the second space and permit a flow of gas between the first space and the second space. The passages occupy an area that is greater than 5% of the area of the piston in order to reduce the amount of heat generated in the gas spring. The area of the piston is the difference between the cross-sectional areas of the cylindrical chamber and the piston rod.

20 Claims, 6 Drawing Sheets

Prior Art

GAS SPRING

TECHNICAL FIELD

The present invention relates to a gas spring for a pressing tool, in which the design construction is improved in such a way that a lower operating temperature can be achieved at high loads.

PRIOR ART

Gas springs have come to be widely used throughout industry. One example are pressing tools intended for forming sheet-metal parts in which gas springs are nowadays mainly used for the various spring functions that are required. Thus gas springs are used, for example, for securing sheet metal, returning shuttles and separating tool halves in the pressing process. Gas springs which support a blank holder for pressing sheet metal are loaded at the beginning of the pressing process and relieved by the upward movement of a press slide and/or a press upper part after sheet metal forming. The proportion of the stroke length of a gas spring that is subject to loading is governed by the pressing process and the ultimate appearance of the pressed sheet-metal part. In order to optimize the sheet metal forming operation full control over a pressing cycle is required. The speed of descent of the press upper part during sheet metal forming is often less than the speed of ascent of the press upper part after sheet metal forming.

Since gas springs started to be used in pressing tools the production rate has increased markedly. The increased production rate has resulted in a faster pressing process with consequently higher press speeds and shorter rest time between the pressing cycles in order to maintain a high level of efficiency. In addition, longer production runs have resulted in increased pressing tool operating times, which has in turn placed greater demands on the types of presses currently used for sheet metal forming. These presses are able to cope with substantially higher pressing speeds than the presses available when the gas spring was first introduced in the sheet metal forming industry.

Figure 1:
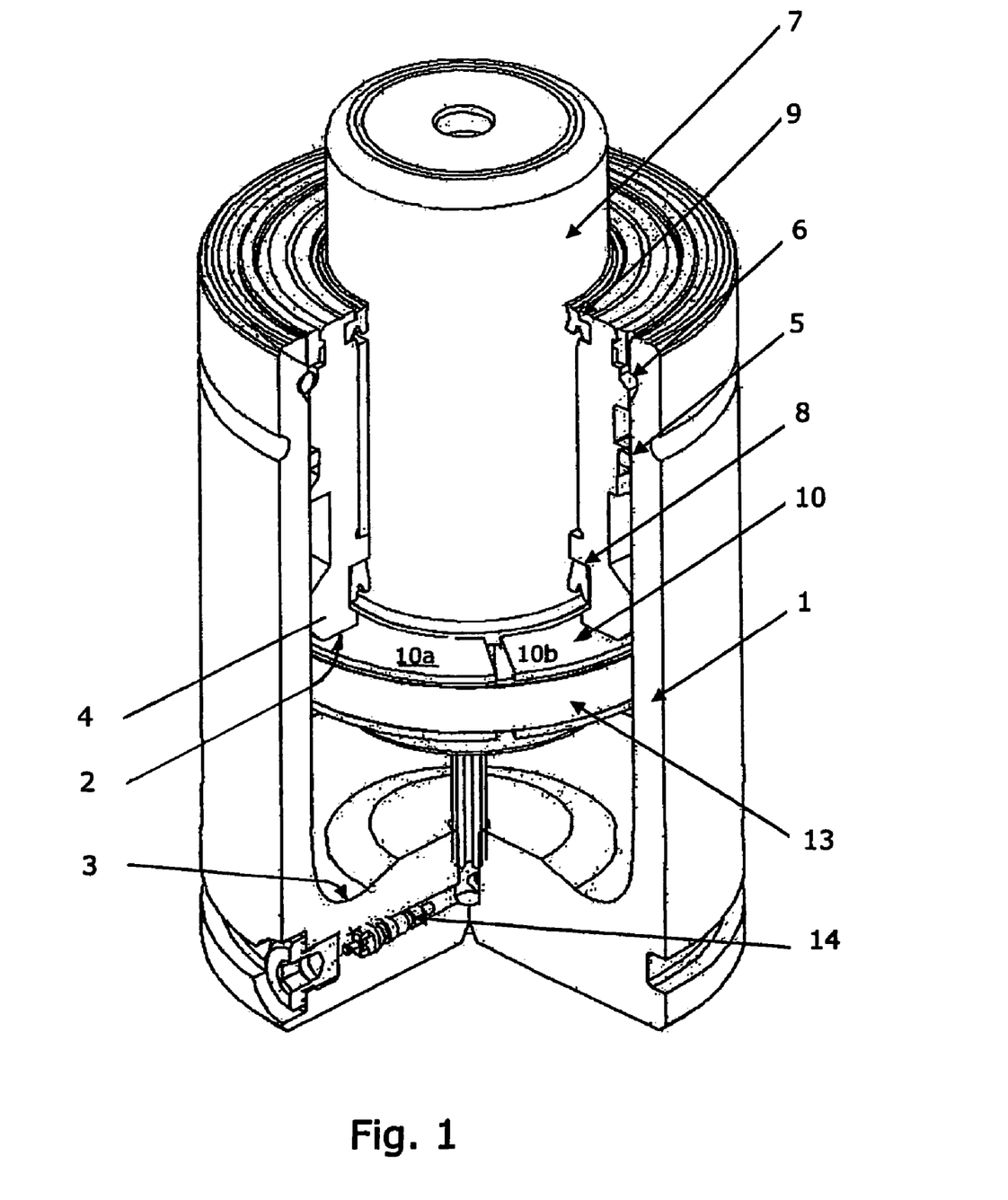
FIG. 1 shows an exploded schematic drawing of a gas spring of prior art, of the type encompassed by the invention.

A gas spring according to the prior art is shown in FIG. 1 and comprises a cylindrical chamber having a first wall formed by one of the base surfaces of the cylinder, and a second wall formed by the other base surface of the cylinder. A piston, which is capable of an axial reciprocating movement in the cylindrical chamber divides said chamber into a first space A between the piston and the first wall and a second space B between the piston and the second wall. The piston is fastened to a piston rod which is axially moveable in a piston rod guide in the first wall. The gas spring with its spring force is thereby capable of counteracting a movement produced by forces acting axially on the piston rod, in that the first space and the second space are pressurized by means of a gas, which flows, via passages connecting the first space and the second space, from the space subject to compression to the space that is subject to expansion under the axial movement of the piston rod. The gas in the piston therefore flows in a direction counter to the direction of movement of the piston. The piston is of annular design and is arranged around the piston rod.

A gas spring functions briefly as follows. The two spaces are charged, to a pressure of 150 bar, for example, with a gas, generally nitrogen. The gas pressure acts on the piston and the piston rod, thereby producing a spring force acting on the piston rod when this is displaced. The area which gives a specific spring force for a specific gas pressure is therefore the cross-sectional area of the piston rod. In operation, the entire piston rod of the gas spring may be pressed in by a force that is applied to the piston rod, the nitrogen gas being compressed in the space into which the piston and the piston rod penetrate, whereupon the pressure in said space rises. The extent to which the pressure rises depends upon the pressure build-up of the gas spring (that is to say the configuration of the volumes of the cylinder, the piston and the spaces) and upon the operating temperature. Following a full piston rod stroke, it returns to the unloaded starting position, whereupon a new compression commences. This process is repeated throughout the life of the gas spring. Under compression the gas flows, for example, from the second space B to the first space A via a gap, which in gas springs known in the art occurs between two halves which together make up the piston. The sequence is naturally reversed when the piston moves in the opposite direction. In the current state of the art relating to gas springs, the area of the through-flow passages arranged in the piston, for example by means of the aforementioned gap between the piston halves, generally occupies from 2% to 3% of the area of the piston, the area of the piston here being defined as the difference between the cross-sectional areas of the cylindrical chamber and the piston rod.

The ever faster pressing processes nowadays mean that the gas spring is subjected to increased loading as the movement of the piston inside the gas spring occurs more rapidly and more frequently, which in turn leads to the generation of more heat inside the gas spring so that the operating temperature of the gas spring increases.

The temperature increase is most manifest on gas springs containing pistons designed rest against the inner wall of the tube.

The stroke rate for a machine press is generally between approximately 0.3 and 2 strokes per second, a usual rate being approximately 1 stroke per second. The pressing speed of a machine press and hence the speed of the piston rod and piston of the gas spring during sheet metal forming is usually about 0.2-0.8 m/s. The return speed of the piston rod may reach 1.8 m/s. A machine press usually operates with pressing forces of about 5-600 tons (50-6000 kN), the forces to which each of the gas springs of the pressing tool is subjected usually being between approximately 2 kN and 150 kN. The stroke length of a gas spring in such a machine tool usually depends on the forming depth, that is to say the part of the stroke length of the pressing tool performing an operation such as forming sheet metal. A usual stroke length is approximately 100 to 160 mm, but a manufacturer's ordinary standard range usually covers anything from just a few millimeters up to 300-400 mm.

Since most pressing tools are to be found in industries that operate under tight financial constraints, for example the motor vehicle industry in which the pressing tools are used to form sheet-metal parts for vehicle bodies, these pressing tools and hence also the gas springs of the pressing tools will commonly be used in shifts of approximately 2 to 4 hours, but even longer shifts occur of up to 8 or 12 hours, for example, with more than one shift per day, so that the operating time can in some cases approach 20-24 hours per day. Unscheduled stoppages of these pressing tools are very costly.

As an example, one of the best selling gas springs for pressing tools, which delivers a force of 30 kN and has a stroke length of 125 mm, will be subjected to 1.1 strokes/s over a 4-hour shift, 4 times a day, that is to say 16 hours per day.

Current requirements made of a gas spring for a pressing tool are generally that they should be capable of at least 1 million strokes or sometimes 2 million strokes without servicing. Another way of calculating the service life of a gas spring for a pressing tool is in stroke-meters, that is to say stroke length×2×number of strokes. An example of the service life of a gas spring for a pressing tool expressed in stroke meters is 100,000 or 200,000 stroke meters.

When the pressing tool gas spring is charged, usually to 150 bar, and then put into operation, a pressure which may be significantly higher, for example 360 bar, is reached.

For these reasons the manufacture and sale of gas springs for pressing tools involve a number of safety regulations and measures such as testing and pressure vessel approval.

One of the causes of the heat generated inside the gas spring is the increase in pressure that occurs when the gas is compressed in one of the spaces A and B under the inward or outward movement of the piston in the cylinder, due to the piston restricting the gas flow during compression, with the result that a pressure gradient occurs between the two cylinder spaces A and B separated by the piston. The higher the pressing speed, the greater the pressure gradient that occurs. Another cause of the heat generated is friction inside the gas spring, for example in the gas movements, in the contact between seal and piston rod and in the contact between guide and piston rod during the inward and outward movement of the piston and the piston rod. The large amount of heat generated in the gas spring places greater stresses on existing seals, which can result in these being damaged and the gas spring ceasing to function.

An object of the present invention is to reduce the pressure gradient that occurs between the two spaces in the gas spring when it is subjected to frequent long, rapid strokes.

SUMMARY OF THE INVENTION

One aspect of the present invention describes a device in the form of the gas spring for a pressing tool that includes a tube which forms a wall of a cylindrical chamber having a first end wall, which constitutes a first base surface and a second end wall which constitutes a second base surface of the cylindrical chamber. A piston is provided that is designed to rest against the tube, and is capable of reciprocating axially in the cylindrical chamber. The piston divides the chamber into a first space between the piston and the first end wall and a second space between the piston and the second end wall. The piston is attached to a piston rod which is axially moveable and supported so that it can slide in a piston rod guide at the first end wall. The piston has passages which connect the first space and the second space. The passages permit a flow of gas from the space that is subject to compression to the space that is subject to expansion under the axial movement of the piston rod. The gas spring provides an opposing force counteracting a movement that is produced by forces acting axially on the piston rod in that the first space and the second space are pressurized by means of a gas, wherein the passages which permit the flow of gas between the first space and the second space occupy an area which is greater than 5% of the area of the piston. The area of the piston is different between the cross-sectional areas of the cylindrical chamber and the piston rod in order to reduce the amount of heat generated in the gas spring.

A further aspect of the invention describes a method of reducing the pressure gradient that occurs between two pressurized spaces in a gas spring when the gas spring is subjected to spring forces. The method involves the reducing of a pressure gradient that occurs between a first space and a second space in a pressing tool gas spring which comprises a tube which forms a wall of a cylindrical chamber having a first end wall, which constitutes a first base surface and a second end wall which constitutes a second base surface of the cylindrical chamber and in which a piston is capable of reciprocating axially in the cylindrical chamber. The first space comprises a chamber which is formed between the piston and the first end wall and the second space comprises a chamber which is formed between the piston and the second end wall. The piston is attached to a piston rod which is axially moveable and supported so that it can slide in a piston rod guide at the first end wall. The gas spring has an opposing force counteracting a movement that is produced by forces acting axially on the piston rod in that the first space and the second space are pressurized by means of a gas. The first space and the second space are connected by way of passages and gas flowing via the passages from the space that is subject to compression to the space that is subject to expansion under the axial movement of the piston rod. The method includes providing the passages which connect the first space to the second space with a total cross-sectional area which represents at least 5% of the area of the piston. The piston area is regarded as the difference between the cross-sectional areas of the cylindrical chamber and the piston rod.

The advantage of the solution shown is that a reduced operating temperature is achieved, in that less heat is generated in the gas spring at high spring forces and high spring stroke frequency. This applies in particular in the case of long strokes or when a large proportion, for example 70-90%, of the maximum stroke length of the gas spring is used. This permits a faster pressing process when using the spring according to the invention in the pressing industry. The service life of the spring is also increased in that the stresses acting on seals are reduced due to the lower operating temperature.

According to the aspect of the invention an area in the order of 10-15% of the piston area is preferably used for the through-flow passages. Good results in terms of a reduction in the operating temperature are also achieved for passage areas that exceed 7% of the piston area. An improvement is obtained just by increasing the passage area to 5%, but this is not ideal since the reduction in the operating temperature of the gas spring is insufficient. Each percentage point, 6, 7, 8, 9, 10, 11% etc. that the passage area is increased brings a reduction in the operating temperature for a given stroke rate and a given stroke length. If the passage area is increased to more than 25% each percentage point increase falls to bring as great a reduction in the operating temperature as for each percentage point increase in the passage area in the order of 10-15%.

The combination of increasing service life and safety requirements means that the cost of gas springs for pressing tools is relatively high. This makes it economic to repair the gas springs for pressing tools. The pressing tool gas spring according to the invention is therefore designed so that it can be easily dismantled and worn parts replaced before fitting the gas spring to the pressing tool again.

When dismantling, the gas is first discharged via the valve 14. The guide 4 is then pressed in somewhat so that the locking ring 6 can be removed. In this position the piston 10, the piston rod 7 and the guide 4 can be drawn out of the tube 1. Once out of the tube 1, the guide band 13, which holds the piston halves 10*a*, 10*b* in position against the piston rod 7 is dismantled. In this position on the piston rod 7 there is an annular recess in the latter. The piston halves 10*a*, 10*b* are of a complementary shape to this recess, which means that when this shape is inserted into the annular recess it holds the piston halves axially in place. The piston halves 10a, 10b are therefore held radially in place by the guide band, which is in turn supported by the tube when it is inserted in the tube, and the piston halves 10a, 10b are held axially by the recess in the piston rod 7. Forming the piston 10 from two piston halves 10a, 10b in this way therefore affords ease of assembly and dismantling.

The piston in the pressing tool gas spring according to the invention is of the guide-type, that is to say it is designed to rest against the inside of the tube and thereby to guide the end of the piston rod which is situated inside the pressing tool gas spring towards the center of the tube. This means that the piston rod acquires a movement concentrically parallel with the tube and this therefore counteracts any skewing of the piston rod in relation to the guide. Skewing causes wearing of the piston rod and the contact surfaces of the guide, which has a detrimental effect on the service life of the pressing tool gas spring. Seals will also be obliquely loaded, thereby impairing the functioning of the pressing tool gas spring.

A central feature of the invention is the reduction of said pressure gradient and of the operating temperature by increasing the area of the passages in which gas can flow from the first space to the second space in the gas spring. The area of the passages can be increased in several ways. This can be achieved by means of holes in the piston, recesses in the piston, larger gap width between piston halves, or by gaps between several piston parts. Other obvious ways include the arrangement of passages at the side of the piston, for example in the cylinder walls, outside the tube or in the piston rod, by means of so-called overflow ducts. With these further means the passage area may exceed 100%, according to the definition. In increasing the passage area simply by means of holes and/or recesses in the piston, the strength of the piston will probably preclude the passage area from exceeding approximately 70-95%.

EMBODIMENTS

A number of embodiments of the invention are described below with reference to the drawings attached.

Figure 2:
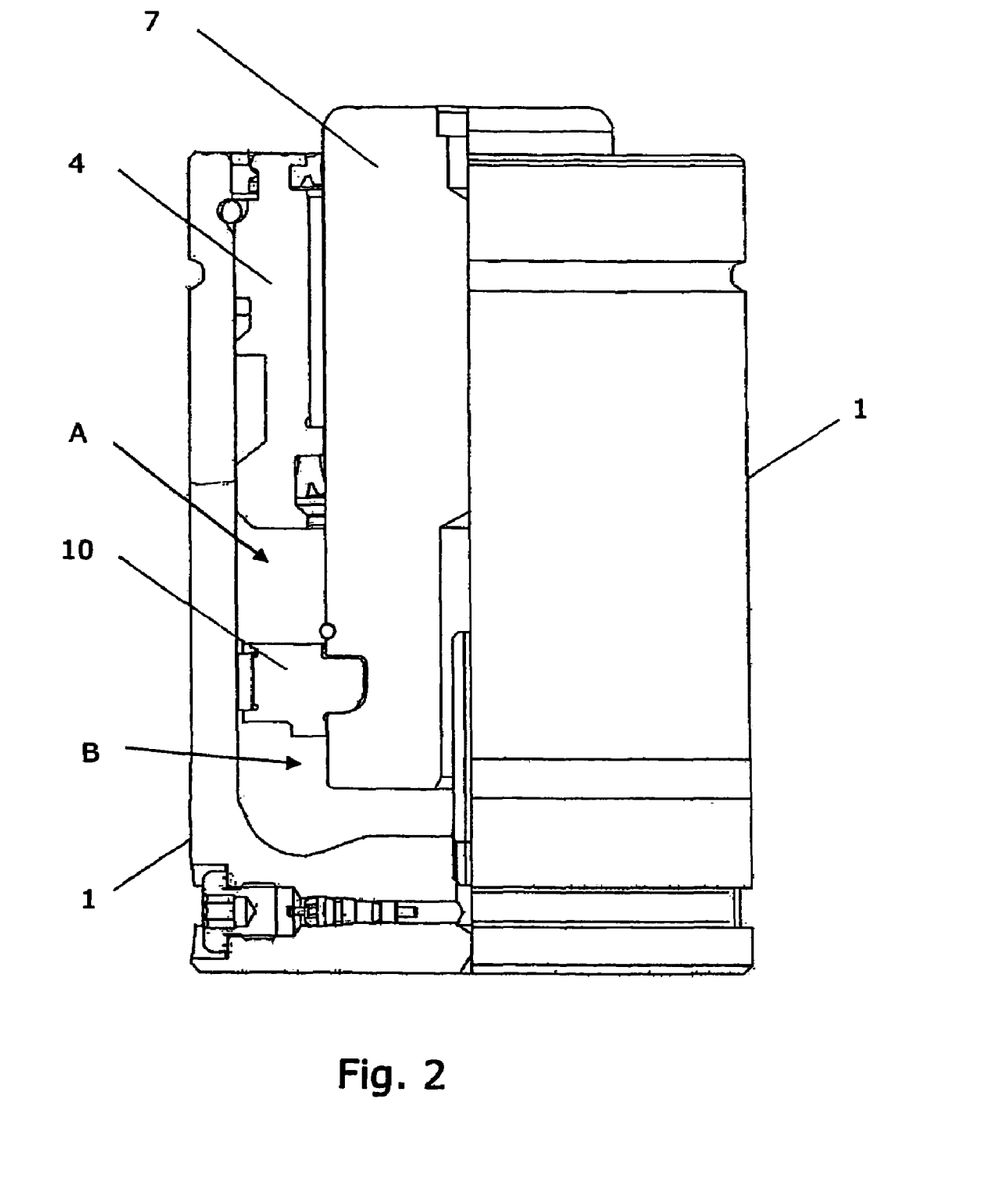
FIG. 2 shows a schematic drawing of partial section through a gas spring.
Figure 3:
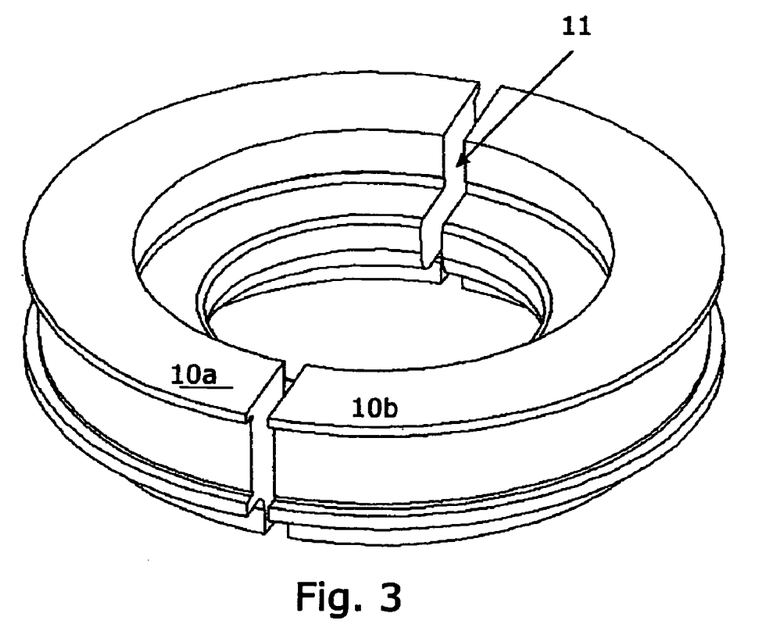
FIG. 3 illustrates a piston according to the prior art in the form of two piston halves in which the through-flow passages comprise a gap between halves of the piston.

FIG. 1 depicts a gas spring of conventional type. A cylindrical tube 1 forms the cylindrical casing of the gas spring and thereby the wall of the cylindrical chamber of the gas spring. The cylindrical chamber is defined by two end walls, a first end wall 2 and a second end wall 3. In the embodiment shown the end wall 2 comprises a piston rod guide 4, which is inserted and sealed in relation to an open end of the tube 1 by means of a static seal 5 and is furthermore locked against the tube 1 by means of a locking ring 6. The other end wall 3 comprises a closed part firmly connected to the tube 1. Running in the piston rod guide 4 is a piston rod 7, which is axially moveable along the axis of the cylindrical chamber and is supported so that it can slide in the piston rod guide 4 and is sealed off against this by means of a dynamic seal 8. A scraper 9 on the outer part of the piston rod guide encloses the piston rod and keeps the piston rod free of oil and dirt. A piston 10 is fitted to the inmost part of the piston rod 7, in this case as two piston halves 10a, 10b, which together form a piston in the form of an annular piston around the piston rod 7. The piston 10 divides the cylindrical chamber of the gas spring into a first space A between the piston 10 and the first end wall 2 and a second space B between the piston 10 and the second end wall 3 (see FIG. 2). In the example the piston halves 10a, 10b are separated by means of a gap 11, shown more clearly in FIG. 3. This gap 11 forms passages for gas to flow between the first and the second space. The piston halves are held together by a guide band 13, which constitutes a guide for the piston 10 in the tube 1.

A gas spring is charged with a gas, which usually consists of nitrogen gas, to a pressure of up to 150 bar, for example. The gas is delivered to the cylindrical chamber via the valve 14 shown in the second end wall.

In the event of a spring movement, which is produced by the application of a force to the outer part of the piston rod 7, so that the piston rod 7 is pressed inwards towards the end wall 3, the gas in the second space B is compressed. A counter-springing force on the piston rod 7 is here created by the compressed gas. Gas can flow through the passages in the form of the gap 11 to the first space A. As previously stated, a pressure gradient occurs between the two spaces A and B when the piston moves in either direction. In the case of rapid piston movements, when the load is large and the stroke length represents a large proportion of the maximum stroke length of the gas spring, the pressure gradient may be large, with the result that the previously described increase in the operating temperature occurs. The through-flow passages are conventionally designed with an area which represents about 2% of the piston area.

One solution to these problems posed by the operating temperature of the gas spring is to make holes or recesses in the piston halves or the piston corresponding to a predefined gas through-flow area between the two spaces A and B, which permits a faster gas through-flow under the inward or outward movement of the piston/piston rod. A larger gas through-flow area results in a reduction of the pressure gradient between the two spaces A and B, in both the inward and the outward movement of the piston/piston rod, thereby reducing the amount of heat generated inside the gas spring.

Figure 4:
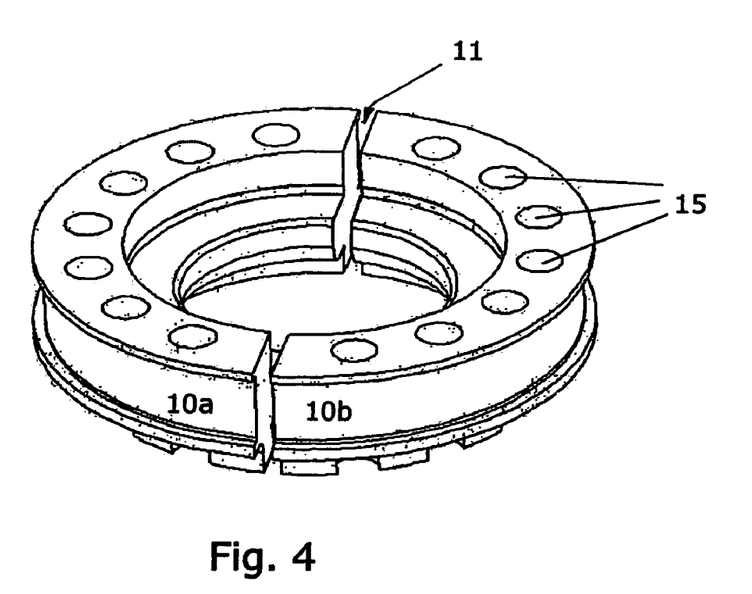
FIG. 4 shows an alternative for increased through-flow area according to the invention.
Figure 5:
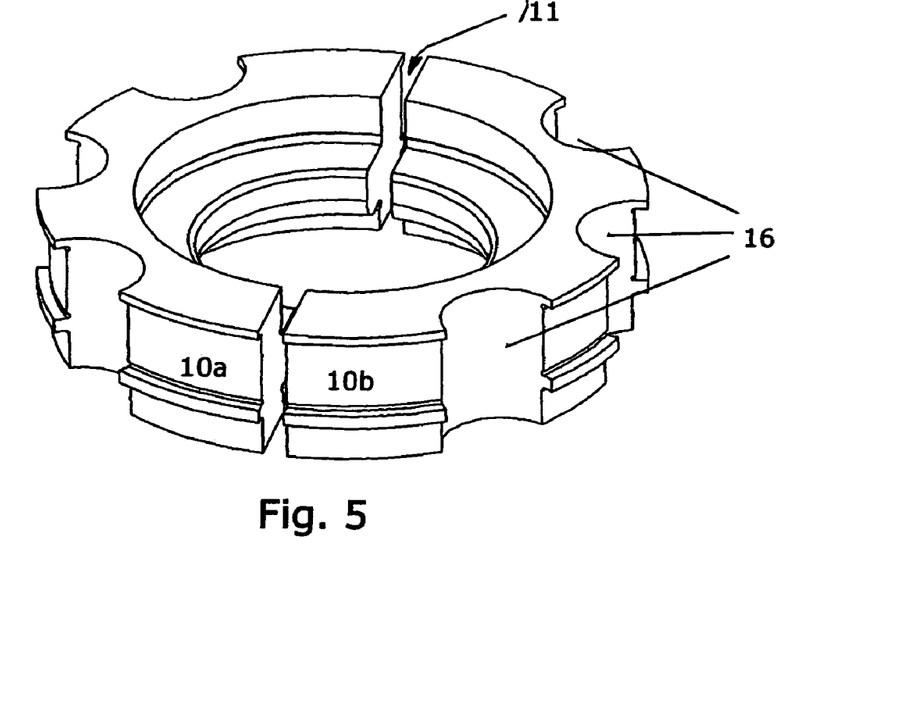
FIG. 5 represents another alternative for increased through-flow area according to the invention.
Figure 6:
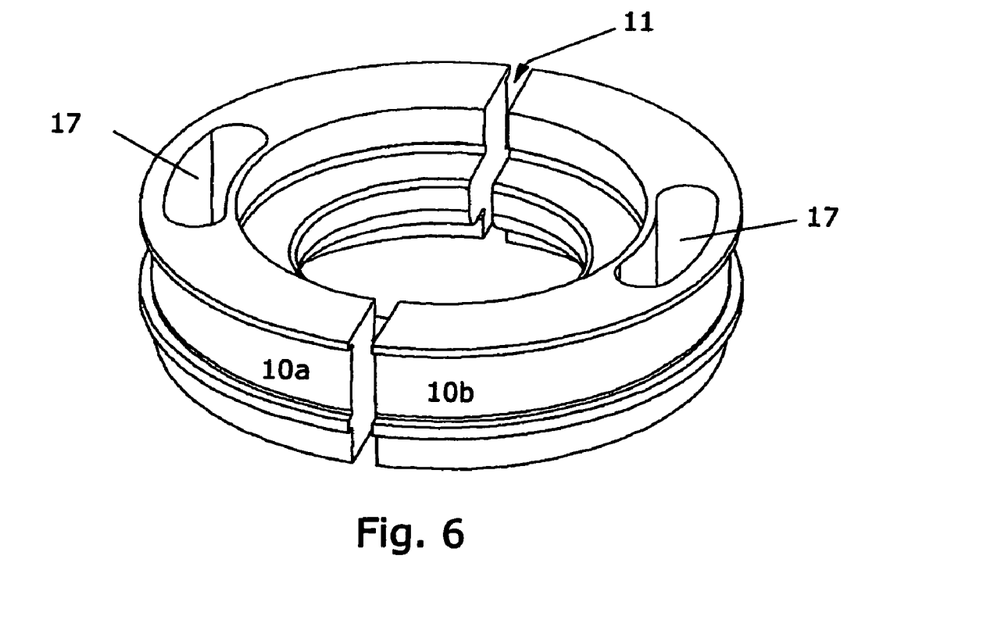
FIG. 6 represents a further alternative for increased through-flow area according to the invention.

A number of variants which specify alternative ways of bringing about an increase in the area of the through-flow passages are shown in FIGS. 4 to 6. In FIG. 4 the area of the passages is increased by making a number of holes 15 around a circle concentric with the periphery of the piston. In the example shown the gap 11 shown constitutes a part of the through-flow passages.

According to another variant of the invention as shown in FIG. 5 a number of recesses 16 have been made in the peripheral surface of the piston 10.

Yet another variant is illustrated in FIG. 6, in which a pair of elongated holes 17 through the piston 10 extend along circular arcs concentric with the periphery of the piston.

There is obviously further scope for the design of the through-flow passages. The essential point is to achieve the desired increase in the gas through-flow area.

The through-flow passages may therefore consist, wholly or in part, of any type of cylindrical cavity that extends axially though the piston, and the cross-section of such a cavity may have any area.

Figure 7A:
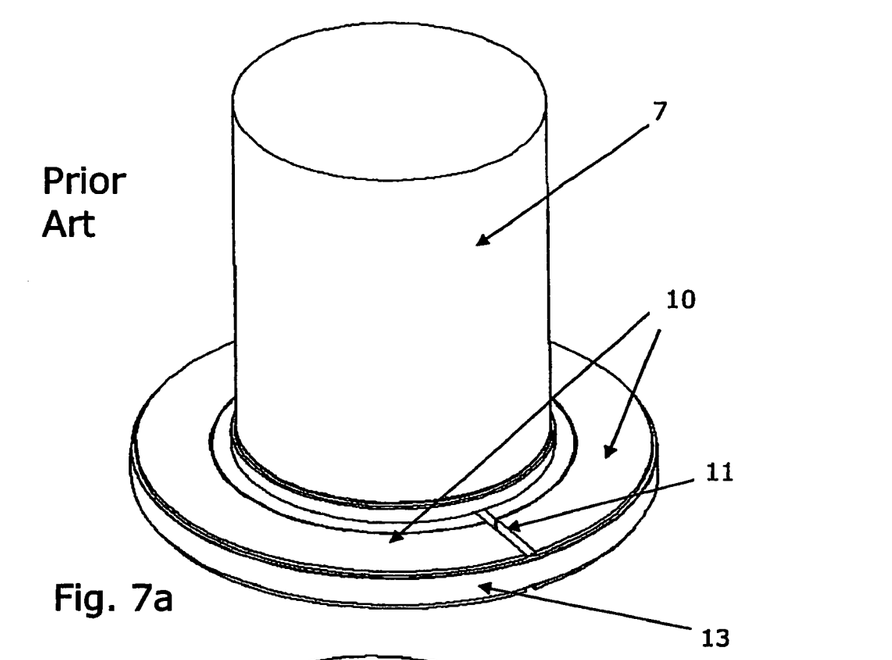
FIG. 7a shows an schematic drawing of a piston/piston rod combination according to the prior art.
Figure 7B:
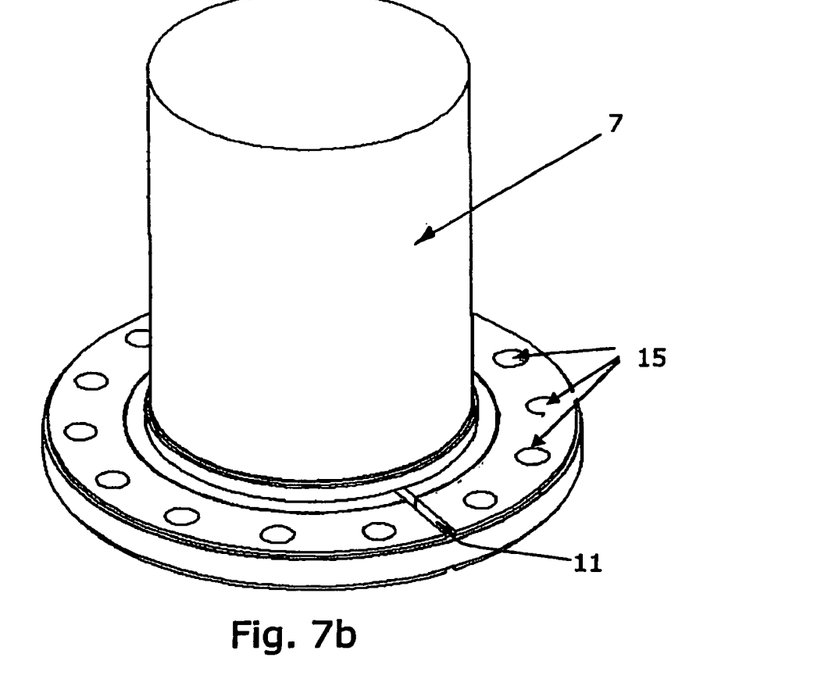
FIG. 7b shows a corresponding alternative according to the invention.

FIG. 7a shows a piston/piston rod combination of prior art and FIG. 7b in the lower figure shows a corresponding piston/piston rod combination according to a variant of the invention.

Figure 8:
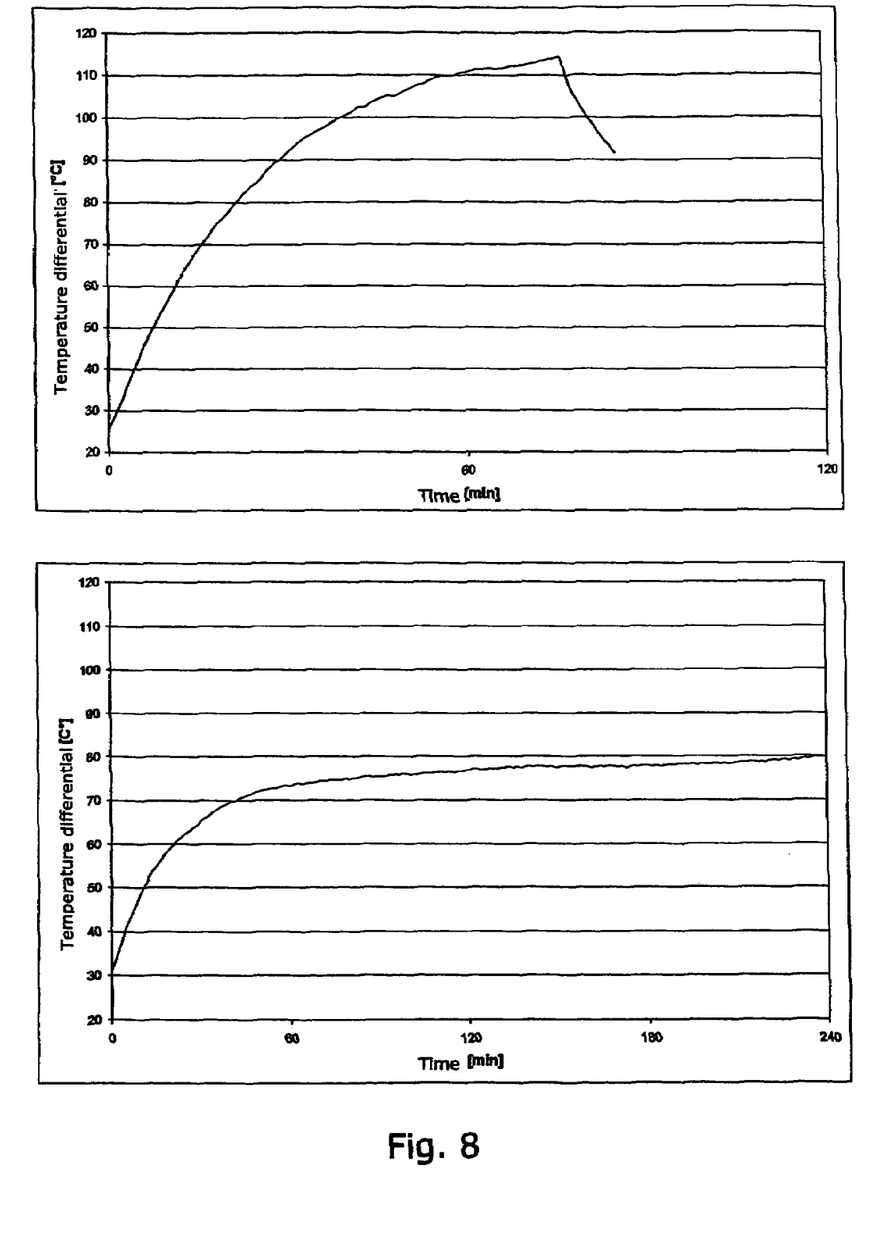
FIG. 8 shows graphs of the operating temperature for a gas spring of conventional design in the upper graph, whilst the lower graph shows the operating temperature curve for a gas spring according to the invention under equivalent loading.

The graphs in FIG. 8 show a first curve for the operating temperature increase over time for a conventional gas spring at a specific load and stroke rate. A second graph shows the corresponding curve for a gas spring according to one of the variants of the invention, in which the gas spring is designed with an area for the through-flow passages representing approximately 15% of the piston area.

The invention claimed is:

1. A gas spring for a pressing tool comprising a tube which forms a wall of a cylindrical chamber, a piston designed to at least partially rest against said tube and is capable of reciprocating axially in said chamber, a piston rod connected to said piston, and a piston rod guide; said chamber having a first end wall and a second end wall, said first end wall forming a first base surface of said chamber and said second end wall forming a second base surface of said chamber, said piston dividing said chamber into a first space between said piston and said first end wall and a second space between said piston and said second end wall, said piston rod guide positioned at said first end wall and designed to support said piston rod as said piston rod axially moves in said cylinder chamber, said piston divided into at least first and second portions, said piston including at least one passageway between ends of said first and second portions that permit a flow of gas between said first and second spaces in said chamber during axial movement of said piston rod, said first and second portions including gas passage structures that also permit a flow of gas between said first and second spaces in said chamber during axial movement of said piston rod, at least one of said first and second spaces including a gas pressure which acts on said piston so as to create an opposing force counteracting axial movement of said piston rod, said at least one passageway between ends of said first and second portions of said piston and said gas passage structures in said first and second portions of said piston occupying an area which is greater than about 5% of an area of said piston, said area of said piston being the difference between the cross-sectional areas of the chamber and the piston rod.

2. The gas spring as defined in claim 1, wherein said at least one passageway between ends of said first and second portions of said piston and said gas passage structures in said first and second portions of said piston occupying an area which is at least about 7% of said area of said piston.

3. The gas spring as defined in claim 2, wherein said at least one passageway between ends of said first and second portions of said piston and said gas passage structures in said first and second portions of said piston occupying an area which is up to about 70% of said area of said piston.

4. The gas spring as defined in claim 3, wherein said at least one passageway between ends of said first and second portions of said piston and said gas passage structures in said first and second portions of said piston occupying an area which is up to about 25% of said area of said piston.

5. The gas spring as defined in claim 1, wherein said gas passage structures in at least one of said first and second portions include at least one opening through said portion.

6. The gas spring as defined in claim 4, wherein said gas passage structures in at least one of said first and second portions include at least one opening through said portion.

7. The gas spring as defined in claim 6, wherein said gas passage structures in said first and second portions include a plurality of openings through said portions.

8. The gas spring as defined in claim 1, wherein said gas passage structures in at least one of said first and second portions include at least one recess in the peripheral surface of said portion.

9. The gas spring as defined in claim 4, wherein said gas passage structures in at least one of said first and second portions include at least one recess in the peripheral surface of said portion.

10. The gas spring as defined in claim 9, wherein said gas passage structures in said first and second portions include a plurality of recesses in the peripheral surface of said portions.

11. A method of reducing a pressure gradient that occurs between a first space and a second space in a pressing tool gas spring which comprises:

providing a tube which forms a wall of a chamber, said chamber having a first end wall and a second end wall, said first end wall forms a first base surface of said chamber and said second end wall forms a second base surface of said chamber;

providing a piston designed to at least partially rest against said tube and is capable of reciprocating axially in said chamber, said piston dividing said chamber into a first space between said piston and said first end wall and a second space between said piston and said second end wall, said piston divided into at least first and second portions;

providing a piston rod connected to said piston;

providing a piston rod guide, said piston rod guide positioned at said first end wall and designed to support said piston rod as said piston rod axially moves axially in said cylinder chamber; and, providing a gas in said cylinder, said piston including at least one passageway between ends of said first and second portions that permit a flow of gas between said first and second spaces in said chamber during axial movement of said piston rod, said first and second portions including gas passage structures that also permit a flow of gas between said first and second spaces in said chamber during axial movement of said piston rod, said gas creating a gas pressure in at least one of said first and second spaces which acts on said piston so as to create an opposing force counteracting axial movement of said piston rod, said at least one passageway between ends of said first and second portions of said piston and said gas passage structures in said first and second portions of said piston occupying an area which is greater than about 5% of an area of said piston so as to reduce heat generation as said piston rod axial moves in said chamber, said area of said piston being the difference between the cross-sectional areas of the chamber and the piston rod.

12. The method as defined in claim 11, wherein said at least one passageway between ends of said first and second portions of said piston and said gas passage structures in said first and second portions of said piston occupying an area which is at least about 7% of said area of said piston.

13. The method as defined in claim 12, wherein said at least one passageway between ends of said first and second portions of said piston and said gas passage structures in said first and second portions of said piston occupying an area which is up to about 70% of said area of said piston.

14. The method as defined in claim 13, wherein said at least one passageway between ends of said first and second portions of said piston and said gas passage structures in said first and second portions of said piston occupying an area which is up to about 25% of said area of said piston.

15. The method as defined in claim 11, wherein said gas passage structures in at least one of said first and second portions include at least one opening through said portion.

16. The method as defined in claim 14, wherein said gas passage structures in at least one of said first and second portions include at least one opening through said portion.

17. The method as defined in claim 16, wherein said gas passage structures in said first and second portions include a plurality of openings through said portions.

18. The method as defined in claim 11, wherein said gas passage structures in at least one of said first and second portions include at least one recess in the peripheral surface of said portion.

19. The method as defined in claim 14, wherein said gas passage structures in at least one of said first and second portions include at least one recess in the peripheral surface of said portion.

20. The method as defined in claim 19, wherein said gas passage structures in said first and second portions include a plurality of recesses in the peripheral surface of said portions.

* * * * *